A. R. BEHNKE.
HUB FOR REMOVABLE WHEELS.
APPLICATION FILED AUG. 3, 1914.
1,134,367.
Patented Apr. 6, 1915.
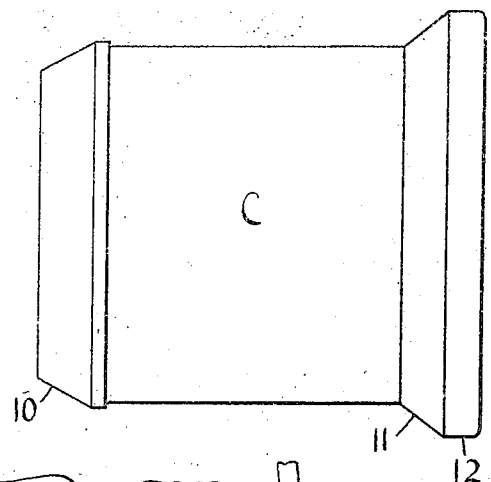
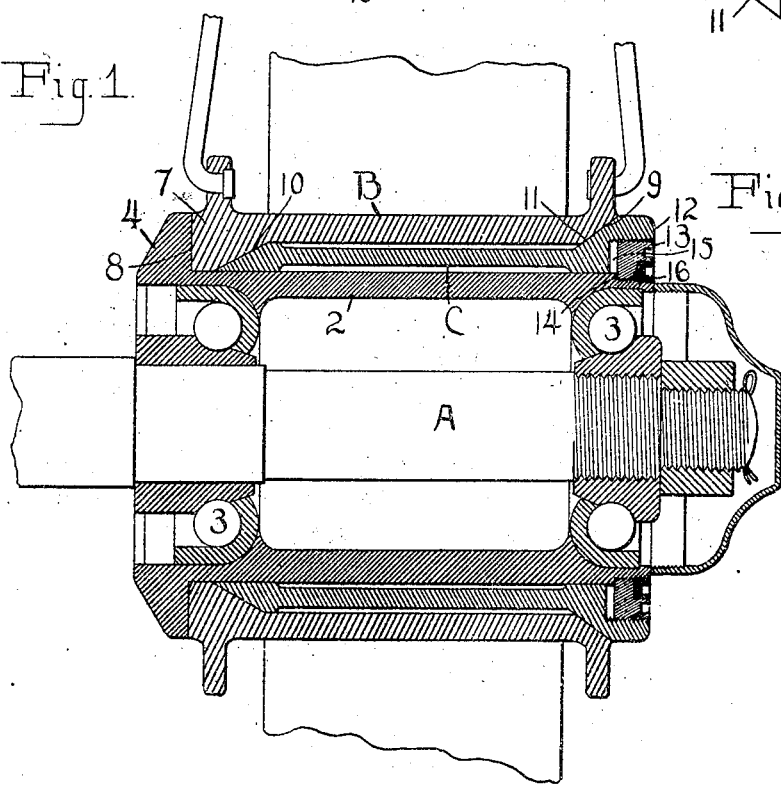
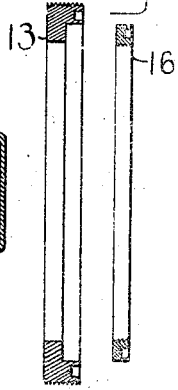
Witnesses
C. K. Davis
A. Swanson.
Inventor
Albert R. Behnke
By Lathrop & Johnson
his Attorneys

UNITED STATES PATENT OFFICE.

ALBERT R. BEHNKE, OF ST. PAUL, MINNESOTA.

HUB FOR REMOVABLE WHEELS.

1,134,367.                  Specification of Letters Patent.      Patented Apr. 6, 1915.

Application filed August 1, 1914. Serial No. 854,490.

*To all whom it may concern:*

Be it known that I, ALBERT R. BEHNKE, a citizen of the United States, residing at St. Paul, in the county of Ramsey and State of Minnesota, have invented certain new and useful Improvements in Hubs for Removable Wheels, of which the following is a specification.

My invention relates to improvements in hubs for removable wheels of motor vehicles and the like, its object being particularly to provide improved mechanism for locking the wheel to the hub.

To this end the invention consists in the construction, combination, and arrangement of parts hereinafter described and claimed.

Figure 1 is a vertical section through the hub and supported spoke supporting member of the wheel; Fig. 2 is an elevation of a locking sleeve; and Figs. 3 and 4 are sectional views of locking nuts forming part of the invention.

Referring to the drawings, A represents the axle upon which is mounted the hub 2 of ordinary construction. The hub 2 is separated from the axle by the ordinary ball bearing 3. The hub 2 at its inner end carries an outwardly extending flange 4. With the exception of the flange 4 the hub 2 may be made of any well known construction.

B represents the cylindrical spoke supporting member of the wheel. The spoke supporting member B at its inner end is formed with a downwardly extending bearing portion 7 having jaw clutch connection 8 with the flange 4. The member B at its outer end is formed with a beveled portion 9.

A cylindrical sleeve C fits within the space between the hub 2 and spoke supporting member B, as shown in Fig. 1, the sleeve at its inner end being formed with a wedge shaped portion 10 to wedge between the hub and bearing portion 7 of the member B, and the outer end of the cylinder being formed with a beveled face 11 to bear against the beveled face 9 and with the flange 12 to project upwardly beyond the end of the member B.

Adapted to be fitted inside the flange 12 is a nut 13 threaded to mesh with the thread on the inner side of the flange 12.

It will be noted that the hub is formed at its upper end with a shoulder 14 against which in use the nut 13 is threaded to bear, leaving a space 15 between the nut and locking cylinder C. A second nut 16 fits within the nut 13 and is threaded upon the hub. The thread of the nut 13 is opposite to that of the nut 16.

In use the wheel is placed upon the hub, the cylinder C shoved into position, and the nuts 13 and 16 screwed into position. The nut 13 being formed with a right hand thread and the nut 16 with a left hand thread, and the two nuts being jammed together will be kept from turning. As will be apparent the nut 16 will have to be entirely loosened before the nut 13 can. Another function of the nuts is to take up the wear of the sleeve C. By reason of the space 15 between the nuts 13 and the cylinder C an inward screwing will loosen the cylinder C when it is desired to remove the wheel.

I claim as my invention:

1. In combination with the spoke supporting member of a wheel, a hub removably supporting the same, the spoke supporting member being cut away upon its inner face to form a rim at one end resting upon the hub and an opening between said member and hub extending to the outer face of the member, a sleeve fitted in said opening and having inclined bearing surfaces at both its inner and outer ends bearing against the adjacent portion of the rim, and a pair of coöperating securing nuts interposed between the outer ends of said sleeve and hub and having screw threaded engagement therewith.

2. In combination with the spoke supporting member of a removable wheel, a supporting hub therefor, said spoke supporting member being cut away upon its inner face to form an opening around the hub with the inner end of the member in contact with the hub and being formed at the inner end of said opening with an inclined face and with an inclined face at the outer end of the opening, a sleeve fitted in said opening and formed with inclined faces bearing against the inclined faces of said spoke member, and means for securing said sleeve in position.

3. In combination with the spoke supporting member of a removable wheel, a supporting hub therefor, said spoke supporting member being cut away upon its inner face to form an opening around the hub with the inner end of the member in contact with the hub and being formed at the inner end of said opening with an inclined face and with an inclined face at the outer end of the opening, a sleeve fitted in said opening and formed with inclined faces bearing against the inclined faces of said spoke member, means for securing said sleeve in position, said means comprising a nut having screw connection with said sleeve, and a second nut fitted within said first nut and having screw connection with the hub, said nuts being oppositely threaded.

In testimony whereof I affix my signature in presence of two witnesses.

ALBERT R. BEHNKE.

Witnesses:
  H. S. JOHNSON,
  H. SWANSON